(12) United States Patent
Lee et al.

(10) Patent No.: US 7,779,174 B2
(45) Date of Patent: Aug. 17, 2010

(54) METHOD AND APPARATUS FOR DYNAMICALLY CHANGING BURST LENGTH USING DIRECT MEMORY ACCESS CONTROL

(75) Inventors: Dong-soo Lee, Suwon-si (KR);
Byong-woong Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 11/755,021

(22) Filed: May 30, 2007

(65) Prior Publication Data
US 2008/0109571 A1 May 8, 2008

Related U.S. Application Data

(60) Provisional application No. 60/856,292, filed on Nov. 3, 2006.

(30) Foreign Application Priority Data
Nov. 30, 2006 (KR) .................... 10-2006-0120069

(51) Int. Cl.
*G06F 13/00* (2006.01)
*G06F 13/28* (2006.01)
*G06F 15/167* (2006.01)

(52) U.S. Cl. ............ 710/35; 710/22; 709/212; 711/100
(58) Field of Classification Search ............ 710/29, 710/35, 22; 709/212; 711/100
See application file for complete search history.

(56) References Cited

U.S. PATENT DOCUMENTS

| | | | |
|---|---|---|---|
| 5,224,213 A * | 6/1993 | Dieffenderfer et al. ......... 710/53 |
| 5,748,560 A * | 5/1998 | Sawada ................. 365/230.03 |
| 6,356,962 B1 * | 3/2002 | Kasper ........................ 710/29 |
| 7,057,912 B2 * | 6/2006 | Hanzawa et al. ......... 365/49.12 |
| 2005/0063315 A1 * | 3/2005 | Chen et al. .................... 370/252 |
| 2005/0165970 A1 * | 7/2005 | Ching et al. ..................... 710/1 |
| 2005/0223131 A1 * | 10/2005 | Goekjian et al. .............. 710/22 |
| 2006/0080478 A1 * | 4/2006 | Seigneret et al. .............. 710/22 |

* cited by examiner

*Primary Examiner*—Alford W Kindred
*Assistant Examiner*—Farley J Abad
(74) *Attorney, Agent, or Firm*—Sughrue Mion, PLLC

(57) ABSTRACT

A direct memory access controlling method includes checking a length value of remaining data corresponding to data remaining after transmission of the data stored in the source memory to the destination memory, and a currently set burst length value, comparing the length value of the remaining data with the currently set burst length value based on a result of the checking, and selectively changing the currently set burst length value based on a result of the comparing, and transmitting data to the destination memory.

17 Claims, 7 Drawing Sheets

METHOD AND APPARATUS FOR DYNAMICALLY CHANGING BURST LENGTH USING DIRECT MEMORY ACCESS CONTROL

CROSS-REFERENCE TO RELATED PATENT APPLICATION

This application claims priority from Korean Patent Application No. 10-2006-0120069, filed on Nov. 30, 2006 in the Korean Intellectual Property Office, and U.S. Provisional Patent Application No. 60/856,292, filed on Nov. 3, 2006 in the U.S. Patent and Trademark Office, the disclosures of which are incorporated herein in their entirety by reference.

BACKGROUND OF THE INVENTION

1. Field of the Invention

Method and apparatus consistent with the present invention relate to transmitting data using direct memory access control.

2. Description of the Related Art

Direct memory access (DMA) control is a method of controlling data stored in a source memory in order for the data to be directly transmitted to a destination memory without passing through a central processing unit (CPU).

In order to use the DMA method, a DMA controlling device needs to be installed on a system bus.

FIG. 1 is a schematic diagram illustrating an operation of a related art DMA controlling apparatus 120. Referring to FIG. 1, a central processing unit (CPU) 110, the DMA controlling apparatus 120, a source memory 130, and a destination memory 140 are connected to a bus 150. The DMA controlling apparatus 120 receives a system controlling authority from the CPU 110 and processes the system controlling functions of the CPU 110. To achieve this, if the system control function is to read or write a data block, for example, the CPU 110 transmits a command for a read/write operation, addresses of the source memory 130 and destination addresses of the destination memory 140, and information about, for example, the amount of data to be transmitted, to the DMA controlling apparatus 120 via the bus 150. After sending the command and the information to the DMA controlling apparatus 120, the CPU 110 performs other operations.

The DMA controlling apparatus 120 controls the data stored in the source memory 130 in order to transmit the data to the destination memory 140 without passing the data through the CPU 110. A control mode of the DMA controlling apparatus 120 when performing the above-described control may be a single mode or a burst mode.

The single mode denotes a mode in which if a high-level interrupt is generated during data transmission to the destination memory 140, the high-level interrupt is processed and the data transmission is then resumed. The burst mode denotes a mode in which transmission of all consecutive data blocks is completed without interruptions. Accordingly, in the single mode, one piece of data is transmitted and received when access permission is granted. In the burst mode, a plurality of data is transmitted and received when access permission is granted.

An operation of the DMA controlling apparatus 120 in the burst mode with reference to FIG. 1 will be described in detail. First, the DMA controlling apparatus 120 transmits to the source memory 130 a signal indicating that the DMA controlling apparatus 120 wants to receive data with a length corresponding to a currently set burst length value. For example, when the burst length value is four words, a signal indicating a desire by the DMA controlling apparatus 120 to transmit data with a length of four words is transmitted to the source memory 130.

In response to the signal from the DMA controlling apparatus 120, the source memory 130 transmits data with a length of four words from among the data that is to be transmitted to the DMA controlling apparatus 120. The DMA apparatus 120 stores the data with a length of four words received from the source memory 130 in a First In First Out (FIFO) memory included in the DMA apparatus 120.

Then, the DMA apparatus 120 transmits to the destination memory 140 a signal indicating a transmission of data with a length of four words, and then transmits the data with a length of four words to the destination memory 140. This transmission process repeats until all of the data stored in the source memory 130 is transmitted to the destination memory 140.

FIG. 2 is a schematic diagram illustrating a data transmission performed by the related art DMA controlling apparatus 120 of FIG. 1. The data transmission illustrated in FIG. 2 is performed when a burst length value is four words and remaining data corresponding to the data remaining in the source memory 130 after repetition of four-word-unit transmissions is six words.

Referring to FIG. 2, in period 210, data corresponding to six words is stored in the source memory 130 before data transmission starts, and the burst length value is set to be four words.

In period 220, four-word data corresponding to the burst length value from among the six-word data remaining in the source memory 130 is transmitted to the destination memory 140, and thus two-word data remains in the source memory 130. Since the burst length value is fixed at four words, the remaining two-word data cannot be transmitted in a burst mode.

In period 230, after the CPU 110 changes the burst mode to a single mode, data corresponding to one word from among the remaining two-word data is transmitted.

In period 240, one-word data remaining in the source memory 130 is transmitted to the destination memory 140 after period 230. Therefore, the transmission of all of the data stored in the source memory 130 is completed.

As described above, in a conventional DMA controlling method, a burst length value is fixed in a burst mode, and thus, data with a length smaller than the fixed burst length value must be transmitted in a single mode. Thus, a CPU must perform an additional operation of changing a mode to transmit the remaining data in the single mode. Moreover, except when a chip is initially designed, there is no way to check the transmission efficiency during the data transmission. In other words, only in the operation of initially designing a chip, the transmission efficiency can be checked.

SUMMARY OF THE INVENTION

The present invention provides a direct memory access controlling apparatus and method in which data is more efficiently transmitted by dynamically changing a burst length value, and a user can determine the efficiency of data transmission by measuring the efficiency of the data transmission.

According to an aspect of the present invention, there is provided a data transmission method using DMA control that is performed between a source memory in which data to be transmitted is stored and a destination memory in which the transmitted data is to be stored, the method including: checking a length value of the remaining data corresponding to data remaining after transmission of the data stored in the source memory to the destination memory, and a currently set burst length value; comparing the length value of the remaining data with the currently set burst length value on the basis of the checked result; and selectively changing the currently set burst length value on the basis of the result of the comparison and transmitting data to the destination memory.

In the selectively changing the currently set burst length value and transmitting the data, if the currently set burst length value is greater than the length value of the remaining data, the currently set burst length value may be changed to a burst length value less than or equal to the length value of the remaining data, and data corresponding to the changed burst length value is transmitted.

In the selectively changing the currently set burst length value and transmitting the data, the burst length value may be changed to a value that is the greatest from among burst length values less than or equal to the length value of the remaining data.

In the selectively changing the currently set burst length value and transmitting the data, if the currently set burst length value is less than or equal to the length value of the remaining data, the currently set burst length value may be not changed.

The data transmission method may further include, before the operation of checking the length value of the remaining data, the operations of receiving a new burst length value from a central processing unit and setting the currently set burst length value to the received new burst length value.

In the setting the currently set burst length value to the received new burst length value, the currently set burst length value may be set to the received new burst length value when a data read/write operation that is currently being conducted is completed.

The data transmission method may further include checking an overall period of time required from the time when the data transmission from the source memory to the destination memory starts to the time when the transmission is completed and estimating the efficiency of the data transmission on the basis of the checked result.

The overall period of time required may be measured on the basis of a clock signal.

The checking the overall period of time may further include checking the number of data read/write operations performed for each burst length value during a period from the time when the transmission starts to the time when the transmission is completed.

The checking the overall period of time may further include checking a period of time required for each burst length value from the time when the transmission from the source memory to the destination memory starts to the time when the transmission is completed.

According to another aspect of the present invention, there is provided a DMA controlling apparatus for controlling transmission of data between a source memory in which data to be transmitted is stored and a destination memory in which the transmitted data is to be stored, the direct memory access controlling apparatus including: a counter unit checking a length value of the remaining data corresponding to data remaining after transmission of the data stored in the source memory to the destination memory, and a currently set burst length value; a comparison unit comparing the length value of the remaining data with the currently set burst length value on the basis of the checked result of the counter unit; a burst length value setting unit selectively changing the currently set burst length value on the basis of the result of the comparison and transmitting data to the destination memory; and a burst signal transmission unit transmitting a burst signal for transmitting data corresponding to the changed burst length value.

The direct memory access controlling apparatus may further include a register storing a new burst length value received from a central processing unit. The burst length value setting unit may set the currently set burst length value to the received new burst length value.

When data transmission from the source memory to the destination memory is completed, the counter unit may check an overall period of time required from the time when the data transmission from the source memory to the destination memory starts to the time when the transmission is completed.

When data transmission from the source memory to the destination memory is completed, the counter unit may check the number of data read/write operations performed for each burst length value during a period from the time when the transmission from the source memory to the destination memory starts to the time when the transmission is completed.

When data transmission from the source memory to the destination memory is completed, the counter unit may check a period of time required for each burst length value from the time when the transmission from the source memory to the destination memory starts to the time when the transmission is completed.

The direct memory access controlling apparatus may further include a transmission efficiency determination unit estimating the efficiency of the data transmission on the basis of the checked result of the counter unit.

According to another aspect of the present invention, there is provided a computer readable recording medium having stored thereon a program for executing the aforementioned data transmission method using DMA control.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE PRESENT INVENTION

The present invention will now be described more fully with reference to the accompanying drawings, in which exemplary embodiments of the invention are shown.

Figure 1:
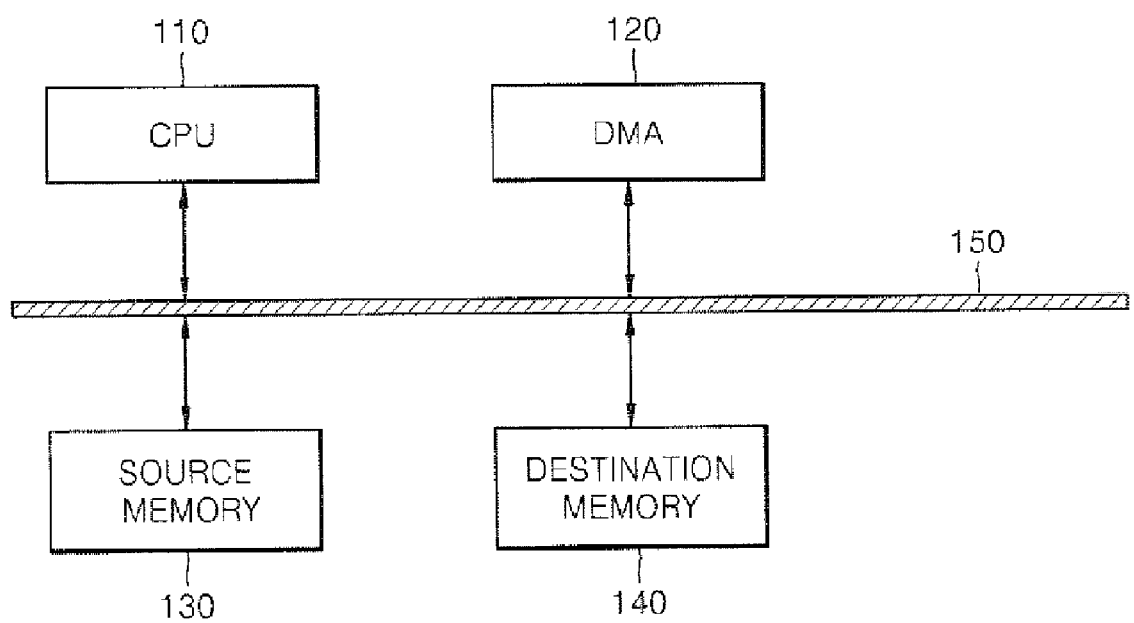
FIG. 1 is a schematic diagram illustrating an operation of a related art DMA controlling apparatus.
Figure 2:
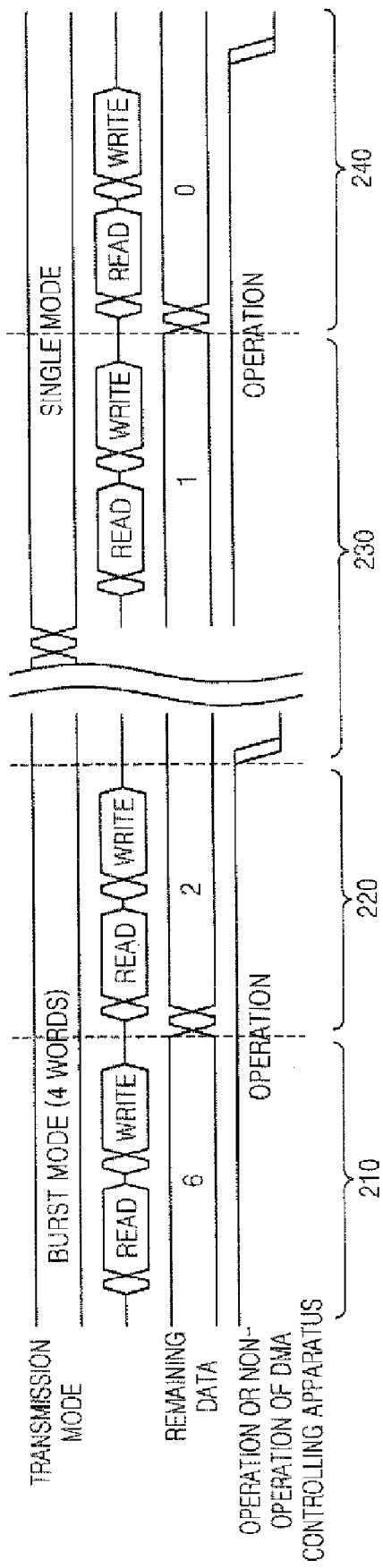
FIG. 2 is a schematic diagram illustrating a data transmission performed by the related art DMA controlling apparatus of FIG. 1.
Figure 3:
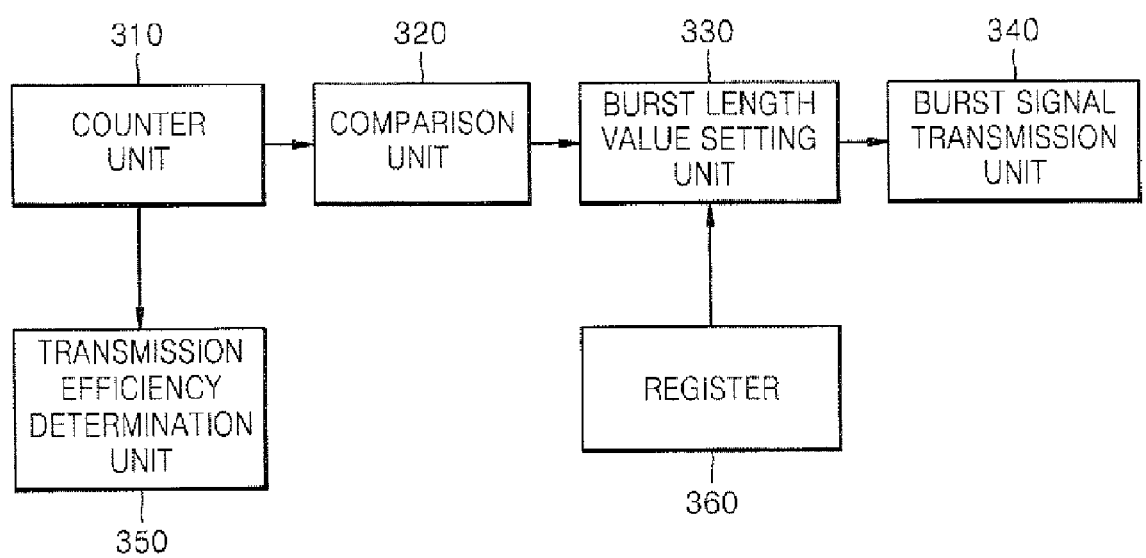
FIG. 3 is a block diagram of a DMA controlling apparatus according to an exemplary embodiment of the present invention.

FIG. 3 is a block diagram of a DMA controlling apparatus according to an exemplary embodiment of the present invention. Referring to FIG. 3, the DMA controlling apparatus includes a counter unit 310, a comparison unit 320, a burst length value setting unit 330, a burst signal transmission unit 340, a transmission efficiency determination unit 350, and a register 360.

The counter unit 310 checks a length value of remaining data and a currently set burst length value.

The remaining data is data that remains in a source memory (not shown) after data stored in the source memory is transmitted to a destination memory (not shown) in which the received data is to be stored.

For example, when data of a length of seven words is stored in the source memory and data corresponding to four words is transmitted to the destination memory, the length of the remaining data is three words. The length of the data transmitted to the destination memory corresponds to a burst length value, and thus, the burst length value is four words.

The unit of the length of data is not limited to a word, and various other units, such as, bytes, half-words, and words, may be used as the unit of the length of data.

The comparison unit 320 compares the length value of the remaining data with the current burst length value on the basis of the checked result of the counter unit.

The burst length value setting unit 330 selectively changes the currently set burst length value according to the result of the comparison performed by the comparison unit 320.

More specifically, if the currently set burst length value is less than or equal to the length value of the remaining data, the current burst length value is maintained. If the currently set burst length value is greater than the length value of the remaining data, the current burst length value is changed to a value smaller than the length value of the remaining data.

For example, if the currently set burst length value is 16 words and the length value of the remaining data is 32 words, the currently set burst length value is maintained as 16 words. However, if the currently set burst length value is 16 words and the length value of the remaining data is 14 words, the currently set burst length value is changed to a value less than 14 words.

A value to which the currently set burst length value can be changed depends on the type of protocol used in data transmission. For example, when an advanced high-performance bus (AHB) protocol, which supports a burst mode and a single mode, is used, one of a 16-word value, an 8-word value, and a 4-word value can be selected as a value to which a currently set burst length value is changed. Accordingly, in the above-described example, when the currently set burst length value is changed, the currently set burst length value should be changed to one of the 8-word value and the 4-word value because only these two values are less than the current burst length value of 16-word.

More specifically, the current burst length value is changed to the greatest burst length value from among values less than or equal to the length value of the remaining data. This is because when the current burst length value is changed to a relatively greater burst length value than the length value of the remaining data, a greater amount of data than the remaining data can be transmitted at one-time transmission. This transmission of extra data contributes to a reduction of the time required to complete the transmission of all the data stored in the source memory. Accordingly, in the example described above, an eight-word value from among an eight-word value and a four-word value is selected as a new burst length value.

The burst signal transmission unit 340 transmits a burst signal for transmitting data according to the changed burst length value.

For example, when the current burst length value is 16 words and is to be changed to 8 words, the burst signal transmission unit 340 transmits a signal for changing the 16-word burst length value to 8 words to the source memory. In other words, the burst signal transmission unit 340 transmits to the source memory a signal representing a desire to receive data in units of 8 words.

In this case, the source memory transmits data in units of eight words corresponding to the changed burst length value after completing a current operation of reading/writing data.

The register 360 stores the burst length value received from a CPU (not shown). The reception of the new burst length value from the CPU may happen when a user inputs a command to change a burst length value to an arbitrary value through an input device.

When a user determines that a current DMA controlling apparatus has been using a bus of a data transmission system for an excessively long period of time, a current burst length value is changed to a value smaller than the current burst length value since the time required to transmit unit data is short, and thus, a device other than the DMA controlling apparatus is able to use the bus between when the transmission of unit data is completed and when the next transmission starts.

When a user inputs an input signal for changing a currently set burst length value to a new burst length value, a CPU that has received the input signal controls the new burst length value in order for the value to be stored in the register 360 of the DMA controlling apparatus. The DMA controlling apparatus changes the current burst length value to the new burst length value stored in the register 360.

However, even when the new burst length value is received by the CPU as described above, the current burst length value is not immediately changed to the new burst length value but changed at the moment when a data read/write operation that is being performed is completed.

Additionally, even when the current burst length value is changed to the new burst length value, the new burst length value set by the CPU is not automatically used as the current burst length value and only if the new burst length value set by the CPU is less than or equal to the length value of the remaining data, the current burst length value is changed to the new burst length value set by the CPU.

For example, if the current burst length value is 16 words, the burst length value received by the CPU is 8 words, and the length of the remaining data is 7 words, the 8-word burst length value set by the CPU is not automatically used but the 8-word burst length value is instead changed to 4 words, which is less than 8 words.

The transmission efficiency determination unit 350 determines the efficiency of data transmission on the basis of, for example, an overall duration required from the time when data transmission starts to the time when the data transmission is completed, the number of data read/write operations performed for each burst length value during the overall duration, and a duration required for each burst length value from the time when data transmission starts to the time when the data transmission is completed. In the current exemplary embodiment, the required durations can be measured on the basis of a clock signal. In other words, the required durations can be measured in units of a clock cycle of the clock signal instead of seconds or minutes, for example, one clock cycle, two clock cycles, etc.

Figure 4:
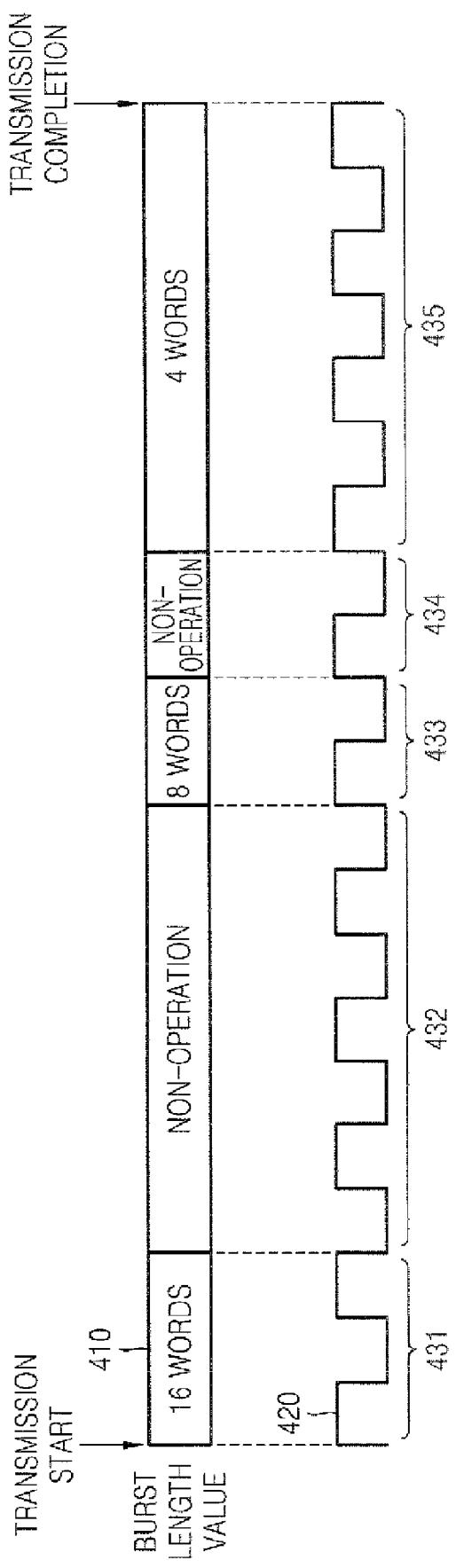
FIG. 4 is a schematic diagram illustrating an operation of a transmission efficiency determination unit included in the DMA controlling apparatus of FIG. 3, according to an exemplary embodiment of the present invention.

FIG. 4 is a schematic diagram illustrating an operation of the transmission efficiency determination unit 350 of the DMA controlling apparatus of FIG. 3, according to an exemplary embodiment of the present invention. Referring to FIG. 4, a burst length value variation 410 during data transmission, and a clock signal 420 are illustrated.

In periods 431, 433, and 435, DMA control is performed. In periods 432 and 434, DMA control is not performed. In other words, a system bus is occupied with a device other than the DMA controlling apparatus.

Referring to FIG. 4, an overall duration required from the time when transmission starts to the time when the transmission is completed corresponds to a sum of the periods 431 through 435. When the overall duration is measured in units of the clock signal 420, the required overall duration is 10.5 clock cycles. Whether the transmission efficiency is high or not may depend on whether the required overall duration is longer than a threshold duration and whether a ratio of a non-activation period to an activation period is greater than a threshold ratio.

For example, if the threshold duration is six clock cycles and the required overall duration to transmit all of the data stored in the source memory is more than six clock cycles, the efficiency of the data transmission is determined to be low. In addition, if it is assumed that the efficiency of transmission is high when a percentage of the required overall duration occupied during a non-activation period is less than 10%, the efficiency of the transmission illustrated in FIG. 4 can be determined to be low because the required overall duration is 10.5 clock cycles and a non-activation period during which DMA control is not performed is 4.5 clock cycles.

Although not shown in FIG. 4, the number of reading and writing operations performed in each of the periods 431, 433, and 435 during which the burst length values are respectively 16 words, 8 words, and 4 words may be counted and compared with a threshold value and thereby, determining whether the transmission efficiency is high or not.

Finally, the durations required for the periods 431, 433, and 435 during which burst length values are respectively 16 words, 8 words, and 4 words may be measured and compared with threshold values and thereby, determining whether the transmission efficiency is high or not.

However, the threshold values may vary according to exemplary embodiments of the present invention.

Figure 5:
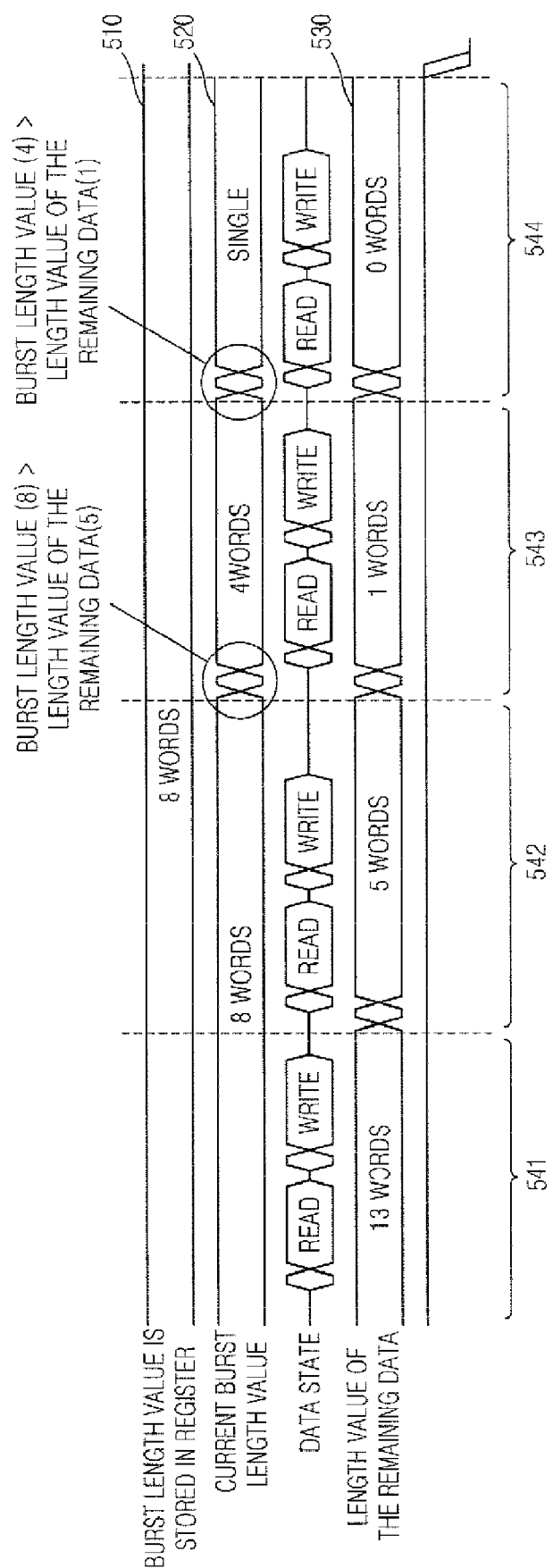
FIG. 5 is a schematic diagram illustrating a method of transmitting data by changing the burst length value, according to an exemplary embodiment of the present invention.

FIG. 5 is a schematic diagram illustrating a method of transmitting data by changing the burst length value, according to an exemplary embodiment of the present invention. Referring to FIG. 5, a burst length value 510 that is stored in the register 360, a current burst length value 520, and a remaining data length value 530 are illustrated.

The burst length value 510 is stored in the register 360 by the CPU when initial data transmission starts, and is changed to a new burst length value when the CPU changes the burst length value during data transmission. More specifically, when the CPU initially stores a burst length value in the register 360, the DMA controlling apparatus sets the current burst length value 520 to the burst length value 510 stored in the register 360. When the new burst length value is stored in the register 360 even during data transmission, the DMA controlling apparatus changes the current burst length value to the new burst length value. However, even when the new burst length value is stored in the register 360 by the CPU as described above, the current burst length value is not immediately changed to the new burst length value but the current burst length value is changed after a data read/write operation that is currently being conducted is completed.

In period 541, the current burst length value is set to eight words, which corresponds to the burst length value stored in the register 360.

In period 542, data corresponding to 8 words, which corresponds to the current burst length value, from among the remaining data of 13 words is transmitted, and the current burst length value is then compared with a length value of the remaining data. As such, the length value of the remaining data is five words and the burst length value is eight words and thus, the remaining data of five words is not transmitted for the burst length value of eight words.

In period 543, the current burst length value of eight words is changed to four words according to the result of the comparison and then, data is transmitted. Also, the current burst length value of four words is compared with the length value of the remaining data. In period 543, the length value of the remaining data is one word and the burst length value is four words. Thus, the remaining data of one word is not transmitted for the burst length value of four words.

In period 544, the control mode of the DMA controlling apparatus is changed from a burst mode to a single mode, and then the remaining data of one word is transmitted. Consequently, the entire data stored in the source memory is completely transmitted to the destination memory.

Figure 6:
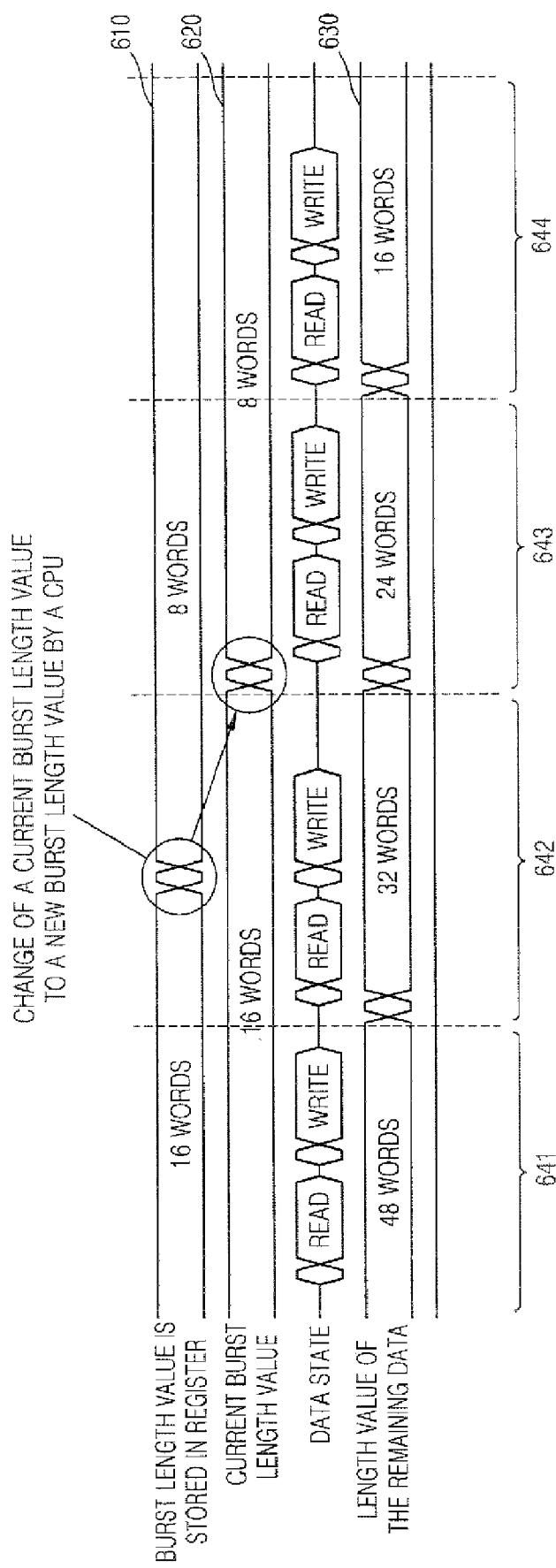
FIG. 6 is a schematic diagram illustrating a method of changing a current burst length value to a new burst length value set by a CPU, according to an exemplary embodiment of the present invention.

FIG. 6 is a schematic diagram illustrating a method of changing a current burst length value to a new burst length value set by a CPU, according to an exemplary embodiment of the present invention. Referring to FIG. 6, a burst length value 610 that is stored in the register 360, a current burst length value 620, and a remaining data length value 630 are illustrated.

In period 641, the current burst length value 620 is set to 16 words, which corresponds to the burst length value 610 stored in the register 360.

In period 642, the remaining data of 48 words is transmitted according to the current burst length value, and thus, the remaining data is 32 words. In period 642, the CPU stores a new burst length value in the register 360. At this time, the current burst length value 620 is not immediately changed to the new burst length value stored in the register 360, but is changed after a data read/write operation that is currently being conducted is completed. In other words, the burst signal transmission unit 340 transmits a signal for changing the current burst length value 620 to a burst length value set by the CPU after the read/write operation is completed.

After the data read/write operation is completed in period 642, the current burst length value 620 is changed to the new burst length value stored in the register 360, and data is transmitted to the destination memory, in period 643. The time when the current burst length value 620 is changed from 16 words to 8 words is indicated by an arrow. The time indicated by the arrow is the time when the data read/write operation that is currently being conducted is completed. The burst signal transmission unit 340 transmits a signal for changing the current burst length value 620 of 16 words to 8 words.

In other words, the source memory does not immediately transmit data corresponding to the changed burst length value stored in the register 360 after receiving the signal from the burst signal transmission unit 340 but after a small amount of time after receiving a signal from the DMA controlling apparatus indicating a reception of the data corresponding to the changed burst length value.

In period 644, data transmission continues in units of a length of eight words corresponding to the changed burst length value.

Figure 7:
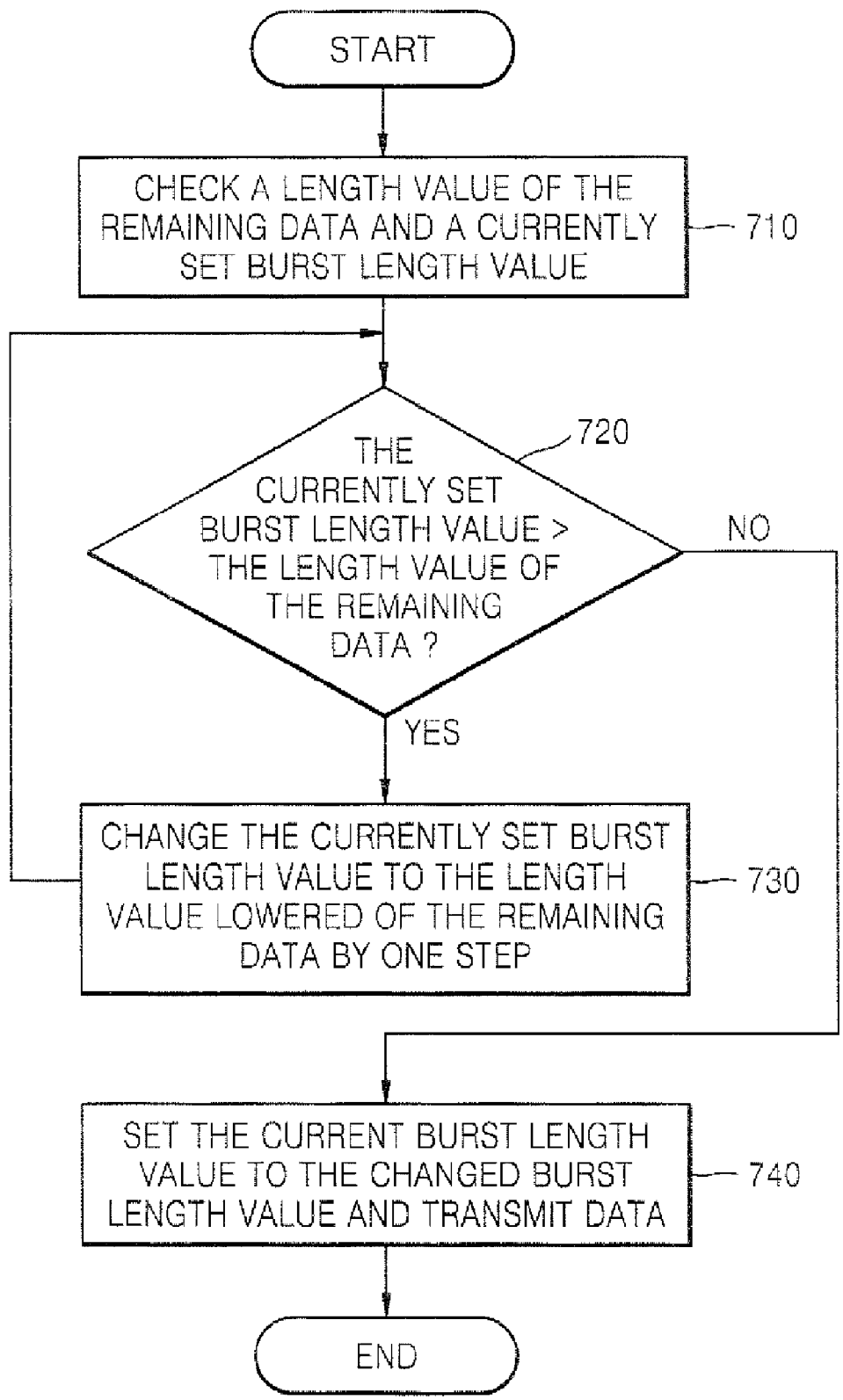
FIG. 7 is a flowchart of a method of transmitting data using DMA control, according to another exemplary embodiment of the present invention.

FIG. 7 is a flowchart of a method of transmitting data using DMA access control, according to another exemplary embodiment of the present invention. In operation 710, a length value of the remaining data corresponding to data remaining after the data stored in the source memory is transmitted to the destination memory and a currently set burst length value are checked.

In operation 720, the length value of the remaining data is compared with the currently set burst length value on the basis of the checked result of operation 710.

In operation 730, if the currently set burst length value is greater than the length value of the remaining data, the currently set burst length value is changed to a length value lowered by one step among burst length values. Then, operation 720 is repeated in order to determine whether the current burst length value is greater than the length value of the remaining data.

If the current burst length value corresponding to the length value lowered by one step is still greater than the length value of the remaining data, the current burst length value is changed to a length value lowered by one more step among burst length values. In this way, the current burst length value is continuously changed until the current burst length value is less than or equal to the length value of the remaining data. If the current burst length value is less than or equal to the length value of the remaining data, the method proceeds to operation 740.

For example, when the current burst length value is 32 words and the length value of the remaining data is seven words, the current burst length value is changed in sequence, for example, in the order of 16 words, 8 words, and 4 words, according to the results of the comparisons.

In operation 740, when the current burst length value is less than or equal to the length value of the remaining data, the current burst length value is set to the changed burst length value, and data is transmitted.

Operations 710 through 740 repeat until the entire data stored in the source memory is transmitted to the destination memory.

In the present invention, data is efficiently transmitted by dynamically changing a burst length value, and a user can determine the efficiency of data transmission by measuring the efficiency of the data transmission.

The exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs).

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A data transmission method using direct memory access (DMA) control that is performed between a source memory in which data to be transmitted is stored and a destination memory in which the transmitted data is to be stored, the method comprising:
   checking a length value of remaining data corresponding to data remaining after transmission of the data stored in the source memory to the destination memory, and a currently set burst length value;
   comparing the length value of the remaining data with the currently set burst length value based on a result of the checking; and
   selectively changing the currently set burst length value based on a result of the comparing, and transmitting data to the destination memory,
   the method further comprising before the checking of the length value of the remaining data:
   receiving a new burst length value from a central processing unit;
   setting the currently set burst length value to the received new burst length value; and
   checking an overall period of time required from a time when the data transmission from the source memory to the destination memory starts to a time when the transmission is completed,
   wherein the checking of the overall period of time further comprises checking a number of data read or write operations performed for each burst length value during a period from the time when the transmission starts to the time when the transmission is completed.

2. The data transmission method of claim 1, wherein in the selectively changing of the currently set burst length value and the transmitting of the data, if the currently set burst length value is greater than the length value of the remaining data, the currently set burst length value is changed to a burst length value less than or equal to the length value of the remaining data, and data corresponding to the changed burst length value is transmitted.

3. The data transmission method of claim 2, wherein in the selectively changing of the currently set burst length value and the transmitting of the data, the currently set burst length value is changed to a value that is greatest from among burst length values less than or equal to the length value of the remaining data.

4. The data transmission method of claim 2, wherein in the selectively changing of the currently set burst length value and the transmitting of the data, if the currently set burst length value is less than or equal to the length value of the remaining data, the currently set burst length value is not changed.

5. The data transmission method of claim 1, wherein in the setting of the currently set burst length value to the received new burst length value, the currently set burst length value is set to the received new burst length value when a data read or write operation currently being conducted is completed.

6. The data transmission method of claim 1, further comprising:
   estimating an efficiency of the data transmission based on a result of the checking of the overall period of time.

7. The data transmission method of claim 6, wherein the overall period of time required is measured based on a clock signal.

8. The data transmission method of claim 6, wherein the checking of the overall period of time further comprises checking a period of time required for each burst length value from the time when the transmission from the source memory to the destination memory starts to the time when the transmission is completed.

9. The data transmission method of claim 1, wherein the currently set burst length value is set to the received new burst length value after the data read/write operation is completed and if the new burst length value set by the CPU is less that or equal to the length value of the remaining data.

10. A direct memory access (DMA) controlling apparatus for controlling transmission of data between a source memory in which data to be transmitted is stored and a destination memory in which the transmitted data is to be stored, the DMA controlling apparatus comprising:
   a counter unit which checks a length value of remaining data corresponding to data remaining after transmission of the data stored in the source memory to the destination memory, and a currently set burst length value;
   a comparison unit which compares the length value of the remaining data with the currently set burst length value based on a check result of the counter unit; a burst length value setting unit which selectively changes the currently set burst length value based on a result of the comparison and transmits data to the destination memory;
   a burst signal transmission unit which transmits a burst signal for transmitting data corresponding to the changed burst length value; and
   a register which stores a new burst length value received from a central processing unit,
   wherein the burst length value setting unit sets the currently set burst length value to the received new burst length value;
   wherein when data transmission from the source memory to the destination memory is completed, the counter unit checks a number of data read or write operations performed for each burst length value during a period from a time when the transmission from the source memory to the destination memory starts to a time when the transmission is completed; and
   wherein when data transmission from the source memory to the destination memory is completed, the counter unit checks an overall period of time required from the time when the data transmission from the source memory to the destination memory starts to the time when the transmission is completed.

11. The direct memory access controlling apparatus of claim 10, wherein if the currently set burst length value is greater than the length value of the remaining data, the burst length value setting unit changes the currently set burst length value to a burst length value less than or equal to the length value of the remaining data.

12. The direct memory access controlling apparatus of claim 11, wherein the burst length value setting unit changes the burst length value to a value that is greatest from among burst length values less than or equal to the length value of the remaining data.

13. The direct memory access controlling apparatus of claim 11, wherein if the currently set burst length value is less than or equal to the length value of the remaining data, the burst length value setting unit does not change the currently set burst length value.

14. The direct memory access controlling apparatus of claim 10, wherein when data transmission from the source memory to the destination memory is completed, the counter unit checks a period of time required for each burst length value from a time when the transmission from the source memory to the destination memory starts to a time when the transmission is completed.

15. The direct memory access controlling apparatus of claim 10, wherein the counter unit measures the required period of time based on a clock signal.

16. The direct memory access controlling apparatus of claim 10, further comprising a transmission efficiency determination unit which estimates efficiency of the data transmission based on the check result of the counter unit.

17. A computer readable recording medium having stored thereon a program for executing a data transmission method using direct memory access (DMA) control that is performed between a source memory in which data to be transmitted is stored and a destination memory in which the transmitted data is to be stored, the method comprising:
   checking a length value of remaining data corresponding to data remaining after transmission of the data stored in the source memory to the destination memory, and a currently set burst length value;
   comparing the length value of the remaining data with the currently set burst length value based on a result of the checking; and
   selectively changing the currently set burst length value based on a result of the comparing and transmitting data to the destination memory,
   the method further comprising before the checking of the length value of the remaining data:
   receiving a new burst length value from a central processing unit;
   setting the currently set burst length value to the received new burst length value; and
   checking an overall period of time required from a time when the data transmission from the source memory to the destination memory starts to a time when the transmission is completed,
   wherein the checking of the overall period of time further comprises checking a number of data read or write operations performed for each burst length value during a period from the time when the transmission starts to the time when the transmission is completed.

* * * * *